(12) United States Patent
Landrith

(10) Patent No.: US 6,713,731 B2
(45) Date of Patent: Mar. 30, 2004

(54) FAST RESPONSE, MULTIPLE-LOOP TEMPERATURE REGULATOR

(75) Inventor: James E. Landrith, Andover, NJ (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 09/911,883

(22) Filed: Jul. 24, 2001

(65) Prior Publication Data

US 2002/0075061 A1 Jun. 20, 2002

Related U.S. Application Data

(60) Provisional application No. 60/256,315, filed on Dec. 18, 2000.

(51) Int. Cl.[7] ............................................... H05B 1/02
(52) U.S. Cl. ........................ 219/497; 219/501; 219/210
(58) Field of Search ................................ 219/497, 499, 219/501, 505, 210, 209, 483, 486, 481; 374/100–103, 1–4

(56) References Cited

U.S. PATENT DOCUMENTS

| | | | | |
|---|---|---|---|---|
| 4,317,985 A | * | 3/1982 | Wilson | 219/210 |
| 4,404,459 A | * | 9/1983 | Harton | 219/209 |
| 4,415,790 A | * | 11/1983 | Diesch et al. | 219/499 |
| 4,657,572 A | * | 4/1987 | Desai et al. | 219/485 |
| 4,870,252 A | * | 9/1989 | Balmer | 219/501 |
| 5,811,764 A | * | 9/1998 | Hirst | 219/497 |

OTHER PUBLICATIONS

"Enhanced temperature controller is both fast and precise," EDN, Mar. 1, 2001; Galan, P; pp 111, 112, 114, 116, 118, and 120.

* cited by examiner

*Primary Examiner*—Mark Paschall
(74) *Attorney, Agent, or Firm*—Lerner, David, Littenberg, Krumholz & Mentlik, LLP

(57) ABSTRACT

An apparatus for regulating a temperature of an object to a desired temperature includes a feedback circuit operable to produce a feedback error signal based on a difference of the desired temperature of the object and the temperature of the object; and a heating circuit operable to impart heat to the object as a substantially linear function of a command signal, the command signal being based on the feedback error signal.

44 Claims, 4 Drawing Sheets

FAST RESPONSE, MULTIPLE-LOOP TEMPERATURE REGULATOR

CROSS-REFERENCE TO RELATED APPLICATIONS

This application claims the benefit of U.S. Provisional Patent Application No. 60/256,315, filed Dec. 18, 2000, entitled FAST RESPONSE, MULTIPLE-LOOP TEMPERATURE REGULATOR, the entire disclosure of which is hereby incorporated by reference.

BACKGROUND OF THE INVENTION

The present invention relates to methods and/or apparatus for regulating a temperature of an object to a desired temperature and, more particularly, to methods and/or apparatus for regulating the temperature utilizing feed-forward and feedback control techniques.

It is desirable to tightly regulate the temperature of certain electronic circuitry in order to stabilize undesirable circuit variations as functions of temperature. With reference to FIG. 1, a structure 10 consistent with the prior art may include an object to be heated 12 and a heating resistor 14 disposed in proximity with one another on a thermal conductor 16. The heating resistor 14 is driven with voltage and current such that it imparts heat into the thermal conductor 16 and the object 12.

With reference to FIG. 2 an apparatus 20 in accordance with the prior art is utilized to drive the heating resistor 14 in a controlled fashion. In particular, an error amplifier 22 produces a drive signal in response to a temperature set signal and a feedback signal. The drive signal causes current to flow in the heating resistor 14. As the heating resistor 14 and the object 12 are in thermal communication with one another, the temperature of the object 12 increases in response to the heat produced by the heating resistor 14. A temperature sensor 24 is in thermal communication with the object 12 and produces the feedback signal based on the temperature of the object 12. A compensation network, such as a capacitor or combination of one or more capacitors and resistors, is coupled in a feedback relationship around the error amplifier 22 in order to provide closed loop stability.

Although the apparatus 20 is capable of imparting heat to the object 12, it suffers from at least one significant disadvantage. In particular, the apparatus 20 exhibits either under-damped or over-damped loop characteristics and, therefore, poor transient response. This is so because the heat produced by the heating resistor 14 is proportional to the square of the current of the drive signal (i.e., $P=I^2 \times R$, where P is the power dissipated by the heating resistor 14, I is the current of the drive signal, and R is the resistance of the heating resistor 14). This non-linear relationship between the drive signal and resultant power in the heating resistor 14 causes an overall loop gain function that is non-linear. Consequently, the closed loop response (without linearization) tends towards under-damped or over-damped characteristics depending on the actual power required to maintain the desired temperature of the object 12. The under-damped characteristic of the loop response may be adjusted by way of the compensation network. In order to obtain sufficient phase margin (i.e., to eliminate the under-damped characteristic), however, the time constant (and physical size) imposed by the compensation network must be large (often measured in minutes). This results in an over-damped characteristic and, thus, the speed with which the temperature of the object 12 may be adjusted is undesirably slow with components that are undesirably bulky for use in the space constraints of microwave circuitry.

The problems caused by the under-damped and/or over-damped characteristic of the apparatus 20 are exacerbated in the presence of a thermal base 18 (FIG. 1) that tends to draw the temperature of the object 12 towards a base temperature (e.g., a cooler temperature than the desired temperature of the object 12). It is noted that a material 17 exhibiting moderate thermal conductivity may be interposed between the thermal conductor 16 and the thermal base 18. For example, at a start-up condition, the thermal base 18 will have drawn the temperature of the object 12 (e.g., an electronic circuit) to the base temperature (often resulting in a large difference between the desired and actual temperatures of the object 12). If the apparatus 20 is under-damped, it will cause the temperature of the object 12 to overshoot (and then oscillate about) the desired temperature during a transient condition. Variations in the performance of the electronic circuit (object 12) due to temperature will abound. If the apparatus 20 is over-damped, it will sluggishly cause the temperature of the electronic circuit to move from the base temperature to the desired temperature. This will also cause undesirable variations in the performance of the electronic circuit.

The under-damped and/or over-damped characteristics of the apparatus 20 may significantly limit the applications in which an electronic circuit (that requires temperature regulation) may be used. For example, an electronic circuit used in a countermeasures and surveillance system, a telecommunications system, an aircraft system, an aerospace system, etc. may exhibit significant inferior performance when the temperature of the electronic circuit of the given system is not well regulated. In some cases, the electronic circuit may cause a failure in the system, such as a failure to execute a countermeasure, a failure to effect proper communications between parties, a failure to properly execute a flight plan, etc. Such a failure might have a very serious consequence, including loss of life. Moreover, aircraft may sit idle in hot or cold conditions. The aircraft should reach operative temperature quickly when turned on.

Accordingly, there is a need in the art for a new method and/or apparatus for regulating the temperature of an object to a desired temperature such that the desired temperature may be reached quickly without overshoot or oscillation.

SUMMARY OF THE INVENTION

In accordance with one aspect of the present invention, an apparatus for regulating a temperature of an object to a desired temperature includes a feedback circuit operable to produce a feedback error signal based on a difference of the desired temperature of the object and the temperature of the object; and a heating circuit operable to impart heat to the object as a substantially linear function of a command signal, the command signal being based on the feedback error signal. When the object is in thermal communication with a thermal base that tends to draw the temperature of the object to a base temperature, the apparatus preferably further includes a feed-forward circuit operable to produce a feed-forward error signal based on a difference of the desired temperature of the object and the base temperature, where the command signal is an aggregate of the feed-forward and feedback error signals.

Preferably, the heating circuit includes a drive circuit operable to produce at least one of a drive voltage and a drive current in response to the command signal; and at least one active heating component operable to produce the heat as a substantially linear function of the command signal.

The at least one active heating component may be further operable to draw current from a voltage source as a substantially linear function of the command signal. The heating circuit preferably includes a current detection circuit operable to produce a current feedback signal in proportional response to the current drawn by the at least one active heating component. It is preferred that the drive circuit is further operable to produce the at least one drive voltage and drive current in response to the feedback current signal to cause the at least one active heating component to produce the heat as a substantially linear function of the command signal.

Preferably, the at least one active heating component is operable to change its impedance as a function of the command signal such that it produces heat as a substantially linear function of the command signal. The at least one active heating component may be taken from the group consisting of field effect transistors, MOS-gated field effect transistors, N-channel MOS-gated field effect transistors, bipolar transistors, and insulated gate bipolar transistors. It is most preferred that the at least one active heating component is an N-channel MOS-gated field effect transistor. In an alternative embodiment, the at least one active heating component may include at least two transistors operatively connected in a cascode configuration.

In accordance with at least one further aspect of the present invention, the feed-forward circuit includes a first temperature sensor operable to produce a first temperature signal in correspondence with the base temperature; and a forward error amplifier circuit operable to produce the feed-forward error signal in response to the first temperature signal and a reference signal representing the desired temperature of the object. Preferably, the feedback circuit includes a second temperature sensor operable to produce a second temperature signal based on the temperature of the object; and a feedback error amplifier circuit operable to produce the feedback error signal in response to the second temperature signal and the reference signal.

In accordance with at least one further aspect of the present invention, the object is a thermally conductive substrate on which an electronic circuit (such as a microwave frequency oscillator) is disposed such that a temperature of the oscillator is regulated to a predetermined temperature by regulating the temperature of the thermally conductive substrate to the desired temperature.

In accordance with at least one further aspect of the present invention, a method for regulating a temperature of an object to a desired temperature includes producing a feedback error signal based on a difference of the desired temperature of the object and the temperature of the object; and heating the object as a substantially linear function of a command signal, the command signal being based on the feedback error signal. When the object is in thermal communication with a thermal base that tends to draw the temperature of the object to a base temperature, the method may further include producing a feed-forward error signal based on a difference of the desired temperature of the object and the base temperature, where the command signal is an aggregate of the feed-forward and feedback error signals.

BRIEF DESCRIPTION OF THE DRAWINGS

For the purposes of illustrating the invention, there are shown in the drawings forms which are presently preferred, it being understood, however, that the invention is not limited to the precise arrangements and/or instrumentalities shown.

DETAILED DESCRIPTION OF THE PREFERRED EMBODIMENTS OF THE INVENTION

Figure 1:
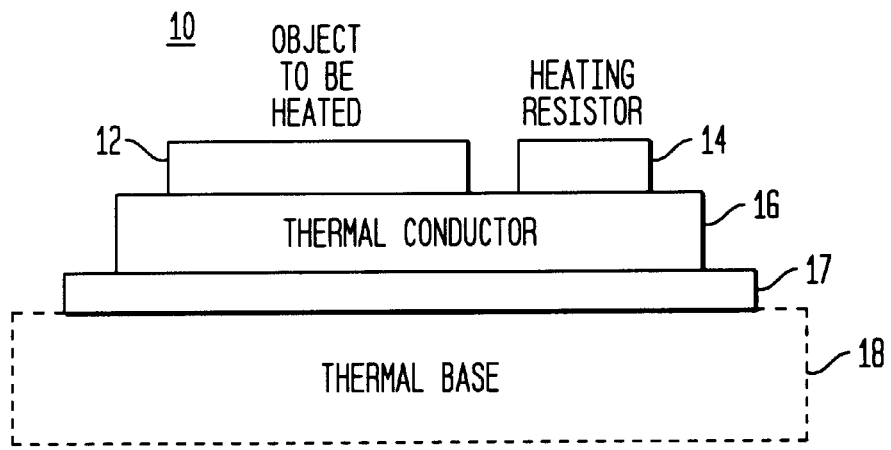
FIG. 1 is a structural block diagram of a heating system in accordance with the prior art.
Figure 2:
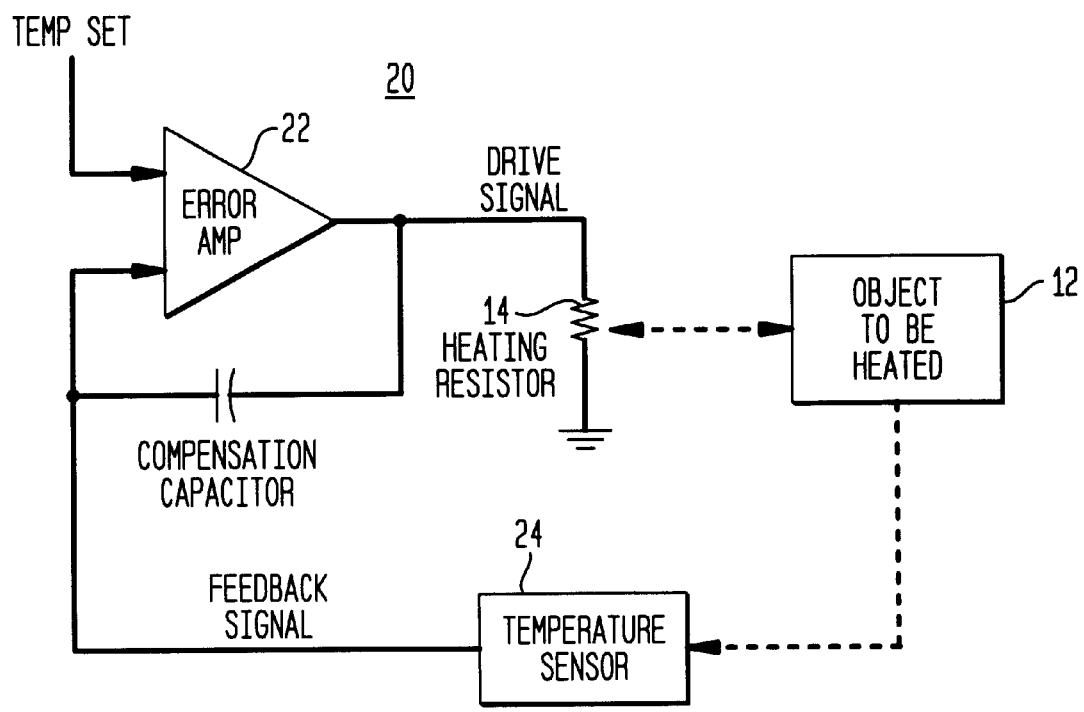
FIG. 2 is a circuit block diagram of an apparatus for regulating a temperature of an object in accordance with the prior art.
Figure 3:
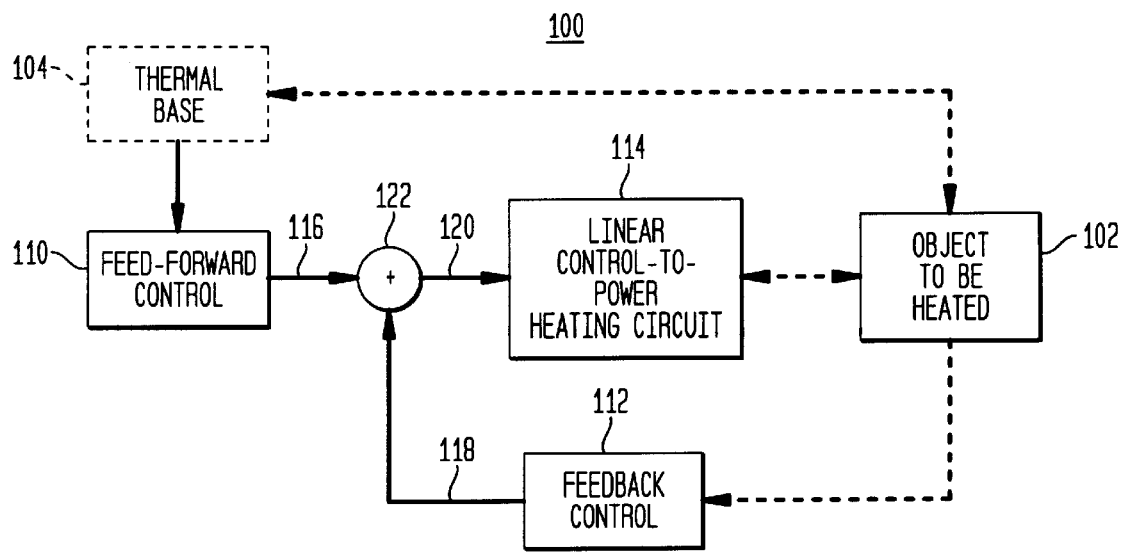
FIG. 3 is a block diagram of a system suitable for regulating a temperature of an object in accordance with at least one aspect of the present invention.

Referring now to the drawings, wherein like numerals indicate like elements, there is shown in FIG. 3 a block diagram of a system 100 for regulating a temperature of an object 102 to be heated. The apparatus 100 preferably includes a feedback control circuit 112, and a heating circuit 114. The feedback control circuit 112 is preferably operable to produce a feedback error signal 118 that is based on a difference of the desired temperature of the object 102 and an actual temperature of the object 102. The feedback error signal is preferably substantially proportional to a difference of the desired temperature of the object 102 and an actual temperature of the object 102. The heating circuit 114 is preferably in thermal communication (shown in dashed line) with the object 102 and is operable to impart heat to the object 102 as a substantially linear function of a command signal 120. The command signal 120 is preferably based on the feedback error signal 118.

When the object 102 is in thermal communication (shown in dashed line) with a thermal base 104 that tends to draw the temperature of the object 102 to a base temperature, the apparatus preferably includes a feed-forward control circuit 110. The feed-forward control circuit 110 is preferably operable to produce a feed-forward error signal 116 that is based on a difference of the desired temperature of the object 102 and the base temperature, where the command signal 120 is an aggregate of the feed-forward and feedback error signals 116, 118. A summing circuit 122 may be employed to provide the aggregating function. Preferably, the feed-forward control signal 116 is substantially proporational to the difference of the desired temperature of the object 102 and the base temperature.

Advantageously, the feed-forward control circuit 110 provides an open-loop path from the thermal base 104 to the heating circuit 114 such that the command signal 120 includes information concerning the base temperature. Among the advantages of this feed-forward path, is superior performance at a start-up condition of the object 102 (e.g., a rapid command for high or maximum heating power). This is particularly useful when the object 102 is an electronic circuit that is sensitive to variations in temperature. For example, the thermal base 104 may have drawn the actual temperature of the object 102 to the base temperature prior to start-up and the base temperature (say 30° C.) may be significantly different from the desired temperature of the object 102 (say 60° C.). In response to this difference, the feed-forward control circuit 110 may rapidly cause the control signal 120 to increase (via the feed-forward error signal 116) such that the heating circuit 114 produces a relatively large magnitude of heat (e.g., maximum heat). Advantageously, this results in rapid heating of the object 102 at start-up.

The feed-forward open-loop path through the feed-forward circuit 110 provides rough temperature regulation of the object 102 when the open-loop gain is properly established. It has been found that rough temperature regulation of +/−10° C. may be readily obtained with base temperature excursions exceeding 100° C.

Preferably, the open-loop gain of the feed-forward control circuit 110 takes into account the thermal relationship between the thermal base 104 and the object 102. The thermal path (shown in dashed line) from the thermal base 104 to the object 102 will include a thermal resistance measured in ° C./Watt. This thermal resistance may be utilized to set the open-loop gain through the feed-forward control circuit 110. Preferably, the open-loop gain is inversely proportional to the thermal resistance from the thermal base 104 to the object 102. For example, assuming that the thermal resistance from the thermal base 104 to the object 102 is 30° C./Watt, the base temperature is 30° C., and the desired temperature of the object 102 is 60° C., the gain through the feed-forward control circuit 110 preferably causes the heating circuit 114 to produce heat in proportion to 1/30 Watts/° C. Assuming a constant of proportionality of unity, this would preferably set the command signal 120 to a magnitude that causes the heating circuit 114 to produce 1 Watt of power in addition to any power which may be generated by a stabilized closed feedback loop. With no closed-loop stability requirements, the open-loop response can be essentially instantaneous. Feed-forward proportionality constants other than unity may be used to compensate for non ideal physical placement of the temperature sensors and/or the heater.

Finer temperature regulation is preferably obtained by way of the closed-loop through the feedback control circuit 112. As the actual temperature of the object 102 approaches the desired temperature, the feedback control circuit 112 causes the command signal 120 to decrease (e.g., by reducing a magnitude of the feedback error signal 118). Depending on the open-loop gain, the feed-forward control circuit 110 may also tend to decrease the command signal 120 (e.g., by decreasing the magnitude of the feed-forward error signal 116) as the actual temperature of the object 102 approaches the desired temperature. The closed-loop control through the feedback control circuit 112, however, ensures that the quiescent temperature of the object 102 is substantially consistent with, and tightly regulated to, the desired temperature. It has been found that the temperature regulation achieved by the apparatus 100 approaches +/−0.5° C. or better depending on specific hardware parameters.

The closed-loop gain from the object 102 to the heating circuit 114 through the feedback control circuit 112 may be, and preferably is, substantially lower with the help of open-loop gain from the thermal base 104 to the heating circuit 114 through the feed-forward control circuit 110. Further, both the closed-loop and open-loop gains are substantially linear because the heating circuit 114 exhibits a linear control-to-power (heat) characteristic. Consequently, the overall transient response of the apparatus 100 may be easily designed to achieve a critically-damped characteristic that exhibits a fast step response.

Figure 4:
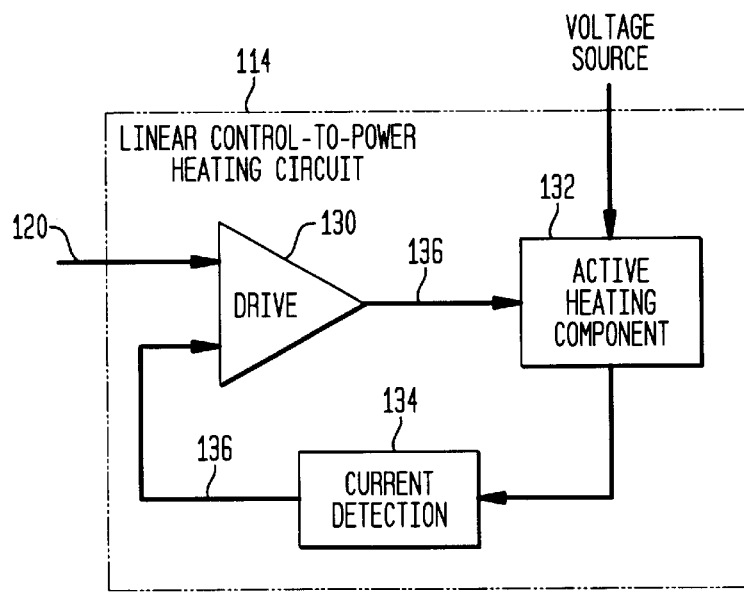
FIG. 4 is a block diagram of a preferred linear control-to-power heating circuit suitable for use in the system of FIG. 3.

Reference is now made to FIG. 4, which is a block diagram of a circuit suitable for implementing the linear control-to-power heating circuit 114. Preferably, the heating circuit 114 includes a drive circuit 130, at least one active heating component 132, and a current detection circuit 134. The drive circuit 130 is preferably operable to produce a drive signal 136 (e.g., a drive voltage and/or a drive current) in response to the command signal 120. The active heating component 132 is preferably operable to produce heat as a substantially linear function of the command signal 120. To this end, the active heating component 132 is preferably operable to draw current from a voltage source as a substantially linear function of the command signal 120. For example, the active heating component 132 may be operable to change its impedance (such as its real resistance) as a function of the command signal 120 such that the heat (i.e., the power) produced by the active heating component 132 is a linear function of the command signal 120. By way of example, this property of the active heating component 132 may be achieved when the active heating component 132 is taken from the group consisting of field effect transistors, MOS-gated field effect transistors, N-channel MOS-gated field effect transistors, bipolar transistors and insulated gate bipolar transistors. It is understood that the active heating component 132 may be implemental using any other suitable known device or any other suitable device developed hereafter. It is most preferred that the active heating component 132 is implemented utilizing one or more N-channel MOS-gated field effect transistors.

The current detection circuit 134 is preferably operable to produce a current feedback signal 138 in proportional response to the current drawn by the active heating component 132. The drive circuit 130 is preferably further operable to produce the drive signal 136 in response to the feedback current signal 138 and the command signal in order to improve the linear relationship between the command signal 120 and the power produced by the active heating component 132. Preferably, the drive circuit 130 is further operable to limit the drive signal 136 such that the current drawn by the active heating component 132 does not exceed a preset threshold.

Figure 5:
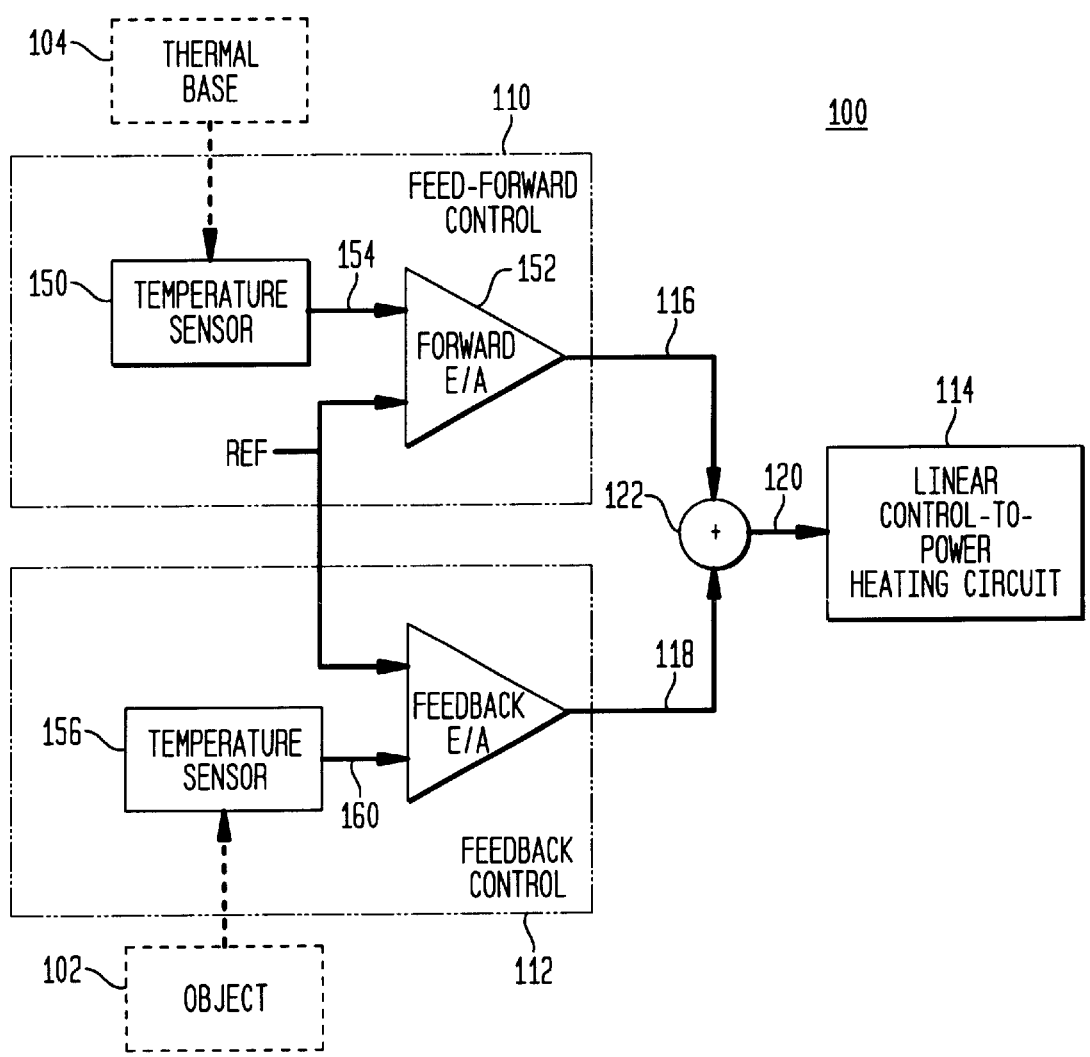
FIG. 5 is a block diagram of a preferred implementation of the system of FIG. 3.

Reference is now made to FIG. 5, which is a block diagram of the apparatus 100 in more detail. The feed-forward control circuit 110 preferably includes a first temperature sensor 150, and a forward error amplifier 152. The desired temperature of the object 102 is established by way of a suitable reference signal labeled REF. The first temperature sensor 150 is preferably operable to produce a first temperature signal 154 in correspondence with the base temperature of the thermal base 104. The forward error amplifier 152 is preferably operable to produce the feed-forward error signal 116 by aggregating (e.g., taking a difference of) the first temperature signal 154 and the reference signal REF.

The feedback control circuit 112 preferably includes a second temperature sensor 156 and a feedback error amplifier 158. The second temperature sensor 156 is preferably operable to produce a second temperature signal 160 based on the temperature of the object 102. The feedback error amplifier 158 is preferably operable to produce the feedback error signal 118 by aggregating (e.g., taking a difference of) the second temperature signal 160 and the reference signal REF.

Figure 6:
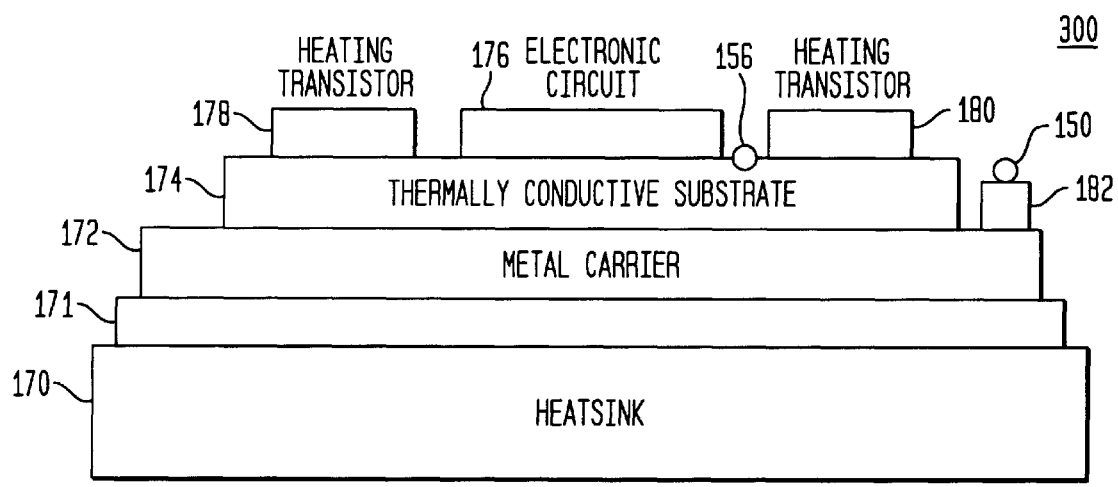
FIG. 6 is a structural block diagram of a preferred configuration for regulating a temperature of an object, such as a microwave frequency oscillator.

Reference is now made to FIG. 6, which is a block diagram illustrating a preferred structure 300 utilizing one or more aspects of the invention. The structure 300 preferably includes a heat sink 170, a metal carrier 172, a thermally conductive substrate 174, an electronic circuit 176, and a heating circuit including at least a first heating transistor 178 and a second heating transistor 180. It is understood that any number of transistors may be employed without departing from the scope of the invention. The electronic circuit 176 is preferably in thermal communication with the thermally conductive substrate 174 and the first and second heating transistors 178, 180. The thermally conductive substrate 174 (such as a low temperature coefficient ceramic material) is preferably disposed on the metal carrier 172 (such as a copper plate) which in turn is disposed on the heat sink 170. It is noted that a material 171 having a moderate thermal conductivity may be interposed between the metal carrier 172 and the heat sink 170. Alternatively, the thermally conductive substrate 174 may be coupled directly to the heat sink 170.

Preferably, the electronic circuit 176 includes a microwave frequency oscillator, such as one or more of the oscillators disclosed in U.S. patent application Ser. No. 09/758,709, entitled SYMMETRIC OSCILLATORS, the entire disclosure of which is hereby incorporated by reference.

One or both of the heat sink 170 and the metal carrier 172 may be considered a thermal base 104 consistent with the discussion above. For example, the heat sink 170 may tend to draw the temperature of the electronic circuit 176 toward a base temperature, such as a lower temperature than a desired operating temperature of the electronic circuit 176. It is contemplated that the thermal base 104 may also be the ambient temperature proximal to the electronic circuit 176.

The first and second heating transistors 178, 180 are preferably N-channel MOS-gated field effect transistors. The heating transistors 178, 180 are preferably symmetrically disposed on the thermally conductive substrate 174 such that the electronic circuit 176 is located substantially between them. Advantageously, this results in desirable heating effects, such as achieving a more uniform thermal gradient across the thermally conductive substrate 174.

Figure 7:
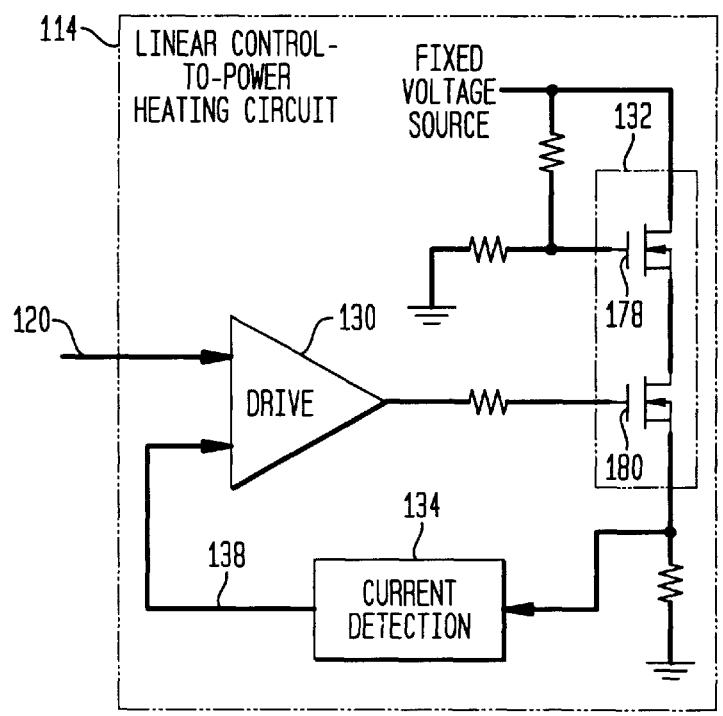
FIG. 7 is a schematic diagram of a suitable implementation of the linear control-to-power heating circuit of FIG. 3.

With reference to FIG. 7, the first and second heating transistors 178, 180 are preferably part of the active heating component 132 of the linear control-to-power heating circuit 114. More particularly, the first and second heating transistors 178, 180 are preferably operatively connected in a cascode configuration such that they each produce the desired portion of power typically half dictated by the command signal 120.

Referring again to FIG. 6, the first temperature sensor 150 may be thermally coupled to the heat sink 170 in order to obtain an indication of the base temperature. It is noted, however, that in many instances, locating the first temperature sensor 150 on the heat sink 170 may not be practicable and, therefore, alternative locations are contemplated by the invention. For example, the first temperature sensor 150 may be disposed on, but thermally insulated from, the metal carrier 172, such as by way of a ceramic standoff 182. The second temperature sensor 156 is preferably thermally coupled to the thermally conductive substrate 174, although other suitable locations for disposing the second temperature sensor 156 are within the scope of the invention, such as on the electronic circuit 176.

Advantageously, the use of a substantially linear control-to-power heating circuit in combination with a feed-forward control path and a feedback control path results in a rapid thermal transient response without overshooting a desired temperature. Thus, undesirable variations in performance of an object (e.g., an electronic circuit) due to temperature may be significantly reduced, even at start-up conditions.

In accordance with at least one further aspect of the present invention, a method for regulating a temperature of an object to a desired temperature is contemplated by the invention. The method may be achieved utilizing suitable hardware, such as that illustrated above in FIGS. 3–7 and/or utilizing any of the known processors that are operable to execute instructions of a software program. In the latter case, the software program preferably causes the processor (and/or any peripheral systems) to execute certain steps in accordance with one or more aspects of the present invention. In either case, the steps and/or actions of the method preferably correspond to at least some of the functions described hereinabove with respect to at least portions of the hardware of FIGS. 3–7. It is also noted that the apparatus of the invention may employ the processor to perform at least some of the functions performed by the hardware schematically shown in FIGS. 3–7 and described herein.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus for regulating a temperature of an object to a desired temperature, comprising:
   a feedback circuit operable to produce a feedback error signal in response to a difference of the desired temperature of the object and the temperature of the object; and
   a heating circuit operable to impart heat to the object as a substantially linear function of a command signal, the command signal being based on the feedback error signal.

2. The apparatus of claim 1, wherein the feedback circuit is operable to produce the feedback error signal in substantial proportion to the difference of the desired temperature of the object and the temperature of the object.

3. The apparatus of claim 1, wherein the heating circuit includes:
   a drive circuit operable to produce at least one of a drive voltage and a drive current in response to the command signal; and
   at least one active heating component operable to produce the heat as a substantially linear function of the command signal.

4. The apparatus of claim 3, wherein:
   the at least one active heating component is further operable to draw current from a voltage source as a substantially linear function of the command signal;
   the heating circuit further includes a current detection circuit operable to produce a current feedback signal in proportional response to the current drawn by the at least one active heating component; and
   the drive circuit is further operable to produce the at least one of the drive voltage and drive current in further response to the feedback current signal to cause the at least one active heating component to produce the heat as a substantially linear function of the command signal.

5. The apparatus of claim 4, wherein the heating circuit further includes a power limiting circuit operable to limit the current drawn by the at least one active heating component when the command signal exceeds a threshold.

6. The apparatus of claim 3, wherein the at least one drive circuit is operable to change the impedance of the active heating component as a function of the command signal such that it produces heat as a substantially linear function of the command signal.

7. The apparatus of claim 6, wherein the at least one active heating component is taken from the group consisting of field effect transistors, MOS-gated field effect transistors, N-channel MOS-gated field effect transistors, bipolar transistors, and insulated gate bipolar transistors.

8. The apparatus of claim 3, wherein the at least one active heating component includes at least two transistors operatively connected in a cascode configuration.

9. The apparatus of claim 8, wherein the at least two transistors are disposed substantially symmetrically about the object.

10. The apparatus of claim 8, wherein the at least two transistors are MOS-gated field effect transistors.

11. The apparatus of claim 1, further comprising a feed-forward circuit operable to produce a feed-forward error signal in response to a difference of the desired temperature of the object and a base temperature, wherein the object is in thermal communication with a thermal base that tends to draw the temperature of the object to the base temperature, and the command signal is an aggregate of the feed-forward and feedback error signals.

12. The apparatus of claim 11, wherein the feed-forward circuit is further operable to produce the feed-forward error signal in substantial proportion to the difference of the desired temperature of the object and the base temperature.

13. The apparatus of claim 11, wherein the heating circuit includes:
a drive circuit operable to produce at least one of a drive voltage and a drive current in response to the command signal; and
at least one active heating component operable to produce the heat as a substantially linear function of the command signal.

14. The apparatus of claim 13, wherein:
the at least one active heating component is further operable to draw current from a voltage source as a substantially linear function of the command signal;
the heating circuit further includes a current detection circuit operable to produce a current feedback signal in proportional response to the current drawn by the at least one active heating component; and
the drive circuit is further operable to produce the at least one of the drive voltage and drive current in further response to the feedback current signal to cause the at least one active heating component to produce the heat as a substantially linear function of the command signal.

15. The apparatus of claim 14, wherein the heating circuit further includes a power limiting circuit operable to limit the current drawn by the at least one active heating component when the command signal exceeds a threshold.

16. The apparatus of claim 13, wherein the at least one active heating component is operable to change its impedance as a function of the command signal such that it produces heat as a substantially linear function of the command signal.

17. The apparatus of claim 16, wherein the at least one active heating component is taken from the group consisting of field effect transistors, MOS-gated field effect transistors, N-channel MOS-gated field effect transistors, bipolar transistors, and insulated gate bipolar transistors.

18. The apparatus of claim 13, wherein the at least one active heating component includes at least two transistors operatively connected in a cascode configuration.

19. The apparatus of claim 18, wherein the at least two transistors are disposed substantially symmetrically about the object.

20. The apparatus of claim 18, wherein the at least two transistors are MOS-gated field effect transistors.

21. The apparatus of claim 11, wherein the feed-forward circuit includes:
a first temperature sensor operable to produce a first temperature signal in correspondence with the base temperature; and
a forward error amplifier circuit operable to produce the feed-forward error signal in response to the first temperature signal and a reference signal representing the desired temperature of the object.

22. The apparatus of claim 21, wherein a gain of the feed-forward circuit is inversely proportional to a thermal resistance from the base temperature to the object.

23. The apparatus of claim 21, wherein the feedback circuit includes:
a second temperature sensor operable to produce a second temperature signal based on the temperature of the object; and
a feedback error amplifier circuit operable to produce the feedback error signal in response to the second temperature signal and the reference signal.

24. The apparatus of claim 23, wherein the object is a thermally conductive substrate on which an operative circuit is disposed such that a temperature of the operative circuit is regulated to a predetermined temperature by regulating the temperature of the thermally conductive substrate to the desired temperature.

25. The apparatus of claim 24, wherein the operative circuit is a microwave frequency oscillator.

26. The apparatus of claim 25, wherein thermally conductive substrate is formed of a ceramic material.

27. The apparatus of claim 25, wherein the second temperature sensor is in thermal communication with the thermally conductive substrate.

28. The apparatus of claim 25, wherein the heating circuit includes at least two transistors operatively connected in a cascode configuration and disposed on the thermally conductive substrate such that the oscillator is substantially between them.

29. The apparatus of claim 25, wherein the heating circuit includes at least two transistors disposed substantially symmetrically about the oscillator on the thermally conductive substrate.

30. The apparatus of claim 28, wherein the at least two transistors are MOS-gated field effect transistors.

31. The apparatus of claim 25, wherein the thermally conductive substrate is disposed on a metal carrier and the metal carrier is thermally coupled to a heat sink.

32. The apparatus of claim 31, wherein the heat sink is substantially at the base temperature.

33. The apparatus of claim 32, wherein the first temperature sensor is coupled to, and thermally isolated from, the metal carrier.

34. The apparatus of claim 32, wherein the first temperature sensor is in thermal communication with the heat sink.

35. An apparatus for regulating a temperature of an object to a desired temperature, the object being in thermal communication with a thermal base that tends to draw the temperature of the object to the base temperature, the apparatus comprising:
a feed-forward circuit operable to produce a feed-forward error signal in response to a difference of the desired temperature of the object and the base temperature;

a feedback circuit operable to produce a feedback error signal in response to a difference of the desired temperature of the object and the temperature of the object; and a heating circuit operable to impart heat to the object as a substantially linear function of an aggregate of the feed-forward and feedback error signals.

36. A microwave frequency oscillator being in thermal communication with a thermal base that tends to draw a temperature of the oscillator to a base temperature, comprising:

a feed-forward circuit operable to produce a feed-forward error signal substantially equal to a difference of a desired temperature of the oscillator and the base temperature;

a feedback circuit operable to produce a feedback error signal substantially equal to a difference of the desired temperature of the oscillator and the temperature of the oscillator; and a heating circuit operable to impart heat to the oscillator as a substantially linear function of a command signal, the command signal being an aggregate of the feedback and feed-forward error signals.

37. A method for regulating a temperature of an object to a desired temperature, comprising:

producing a feedback error signal in response to a difference of the desired temperature of the object and the temperature of the object; and heating the object as a substantially linear function of a command signal, the command signal being based on the feedback error signal.

38. The method of claim 37, further comprising producing a feed-forward error signal in response to a difference of the desired temperature of the object and a base temperature, wherein the object is in thermal communication with a thermal base that tends to draw the temperature of the object to the base temperature, and the command signal is an aggregate of the feed-forward and feedback error signals.

39. The method of claim 38, further comprising employing at least one active heating component to heat the object as a substantially linear function of the command signal.

40. The method of claim 38, further comprising:

producing a first temperature signal in correspondence with the base temperature; and producing the feed-forward error signal in response to the first temperature signal and a reference signal representing the desired temperature of the object.

41. The method of claim 40, further comprising producing the feed-forward error signal in proportion to a thermal resistance from the base temperature to the object.

42. The method of claim 40, further comprising:

producing a second temperature signal based on the temperature of the object; and producing the feedback error signal in response to the second temperature signal and the reference signal.

43. The method of claim 42, wherein the object is a thermally conductive substrate on which an operative circuit is disposed, the method further comprising regulating the temperature of the thermally conductive substrate to the desired temperature such that a temperature of the operative circuit is regulated to a predetermined temperature.

44. A method for regulating a temperature of an object to a desired temperature, the object being in thermal communication with a thermal base that tends to draw the temperature of the object to a base temperature, the method comprising:

producing a feed-forward error signal substantially proportional to a difference of the desired temperature of the object and the base temperature;

producing a feedback error signal substantially proportional to a difference of the desired temperature of the object and the temperature of the object; and heating the object as a substantially linear function of a command signal, the command signal being an aggregate of the feed-forward and feedback error signals.

* * * * *